United States Patent
Koyama et al.

(10) Patent No.: US 7,044,726 B2
(45) Date of Patent: May 16, 2006

(54) MOLD COMPONENT AND MOLD ASSEMBLY

(75) Inventors: Atsushi Koyama, Tokyo (JP); Mamoru Usami, Tokyo (JP); Kenji Yamaga, Tokyo (JP); Mikio Domon, Tokyo (JP); Kazuki Suzawa, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/668,154

(22) Filed: Sep. 24, 2003

(65) Prior Publication Data

US 2004/0062830 A1 Apr. 1, 2004

(30) Foreign Application Priority Data

Sep. 25, 2002 (JP) ............................. 2002-278352

(51) Int. Cl.
*B29D 11/00* (2006.01)

(52) U.S. Cl. ................... 425/192 R; 425/542; 425/810

(58) Field of Classification Search ............ 425/192 R, 425/542, 810; 264/106, 107

See application file for complete search history.

(56) References Cited

U.S. PATENT DOCUMENTS 5,466,145 A * 11/1995 Takahashi .................. 425/190

FOREIGN PATENT DOCUMENTS

| JP | 9-123229 | 5/1997 |
|---|---|---|
| JP | 9-193206 | 7/1997 |
| JP | 2003-11169 | 1/2003 |

OTHER PUBLICATIONS

English Language Abstract of JP 9-193206.
English Language Abstract of JP 2003-11169.
English Language Abstract of JP 9-123229.

* cited by examiner

*Primary Examiner*—Donald Heckenberg
(74) *Attorney, Agent, or Firm*—Greenblum & Bernstein, P.L.C.

(57) ABSTRACT

There is provided a mold component which makes it possible to mold a substrate for an optical recording medium which enables a functional layer having a uniform thickness to be formed thereon without using a resin-coating assisting member. A stamper holder holds a stamper thereon, and has a generally hollow cylindrical shape. An insertion hole formed through a central portion of the stamper has a diameter which is larger than an outer diameter of a cavity-side end of the stamper holder at a higher temperature of the holder than a normal temperature, and is slightly smaller than the outer diameter at the normal temperature of the holder. The cavity-side end inserted into the insertion hole at the higher temperature of the stamper is grasped by a rim of the insertion hole which is reduced in diameter at the normal temperature of the stamper.

7 Claims, 5 Drawing Sheets

MOLD COMPONENT AND MOLD ASSEMBLY

BACKGROUND OF THE INVENTION

1. Field of the Invention

This invention relates to mold components and a mold assembly, for molding a substrate for an optical recording medium.

2. Description of the Related Art

Conventionally, as a mold assembly for molding a substrate D3 (see FIG. 15) for an optical recording medium, such as a CD (Compact Disc) and a DVD (Digital Versatile Disc), a mold assembly has been known which includes a fixed mold having a stamper set thereon for forming micro asperities, such as grooves, in a surface of the substrate D3, and a movable mold having a sleeve set therein for forming a central hole D3h (central hole for mounting the optical recording medium) in the substrate D3. As shown in FIG. 15, the substrate D3 molded using the mold assembly has the central hole D3h formed in a central portion thereof, and micro asperities, such as grooves, not shown, formed in a predetermined area on one surface (upper surface, as viewed in FIG. 15) thereof.

In the above case, the optical recording medium, not shown, is completed by sequentially forming various functional layers (reflection layer, recording layer, protective layer, and so forth) in the predetermined area on the one surface of the substrate D3. In doing this, part (protective layer, for example) of the functional layers is formed by coating resin by a spin coating method, and curing the coated resin by a predetermined curing treatment. Now, it is known that to radially coat the resin substantially uniformly by the spin coating method, it is preferable to drop the resin in the vicinity of the center of the substrate D3 (toward the center within the central hole D3h). To this end, as shown in FIG. 15, a method is proposed in which resin is coated using a disc-shaped member 72 as a resin-coating assisting member. According to this method, the disc-shaped member 72 is placed on the substrate D3 such that it covers the central hole D3h, and the substrate D3 is spinned while the resin is being dropped from a nozzle N onto the disc-shaped member 72, whereby the resin R is coated on the substrate D3. In this method, however, maintenance of the used disc-shaped member 72 (e.g. cleaning of the disc-shaped member 72 having the resin R stuck thereto) is troublesome, and hence the present inventors have already developed a mold assembly 51 (see FIG. 11) for molding a substrate D4 (see FIG. 14) which is formed with a small-diameter central hole D4h and a hollow cylindrical protruding portion D4r formed in a central portion thereof, thereby enabling the resin R to be dropped in the vicinity of the center of the substrate without using a resin-coating assisting member, such as the disc-shaped member 72.

Referring to FIG. 11, the mold assembly 51 includes a fixed mold 61, and a movable mold 21 moving to and away from the fixed mold 61. The mold assembly 51 is configured such that a substrate D4 shown in FIG. 14 can be molded by injecting a molten resin material into a cavity Ca2 defined between the molds 61, 21 which are closed, from an injection molding apparatus, not shown. As shown in FIG. 11, the fixed mold 61 is comprised of a fixed-side mounting plate 12, a fixed-side mirror 63, a sprue bushing 14, a stamper holder 65, and a stamper 66. The fixed-side mounting plate 12 is configured such that it can be mounted on a fixed-side platen of the injection molding apparatus, and has a hole 12a circular in cross section formed through a central portion thereof. The fixed-side mirror 63 is configured to have a disc shape and mounted to the fixed-side mounting plate 12, with a hole 63a circular in cross section formed through a central portion thereof. In this case, as shown in FIG. 13, a plurality of vertical grooves 63c are formed in an inner peripheral surface of the fixed-side mirror 63 which defines the hole 63a. Further, as shown in FIG. 13, the fixed-side mirror 63 has holes 63d formed therethrough such that the holes 63d communicate with the vertical grooves 63c, respectively. The holes 63d serve as air-sucking passages for sucking air to attract the stamper 66 to a mirror surface 63b (surface of the fixed-side mirror 63 toward the cavity Ca2), and communicate with piping, not shown, of a vacuum pump outside the mold assembly 51.

As shown in FIG. 11, the sprue bushing 14 has a hole 14a formed through a central portion thereof, and is fitted into the holes 12a, 63a. The stamper holder 65 is configured to have a hollow cylindrical shape and mounted between the sprue bushing 14 and the fixed-side mirror 63. In the mold assembly 51, as shown in FIG. 13, small gaps are formed between the inner peripheral surface of the stamper holder 65 and an outer peripheral surface of the sprue bushing 14, and between an end face 65b of the stamper holder 65, opposite to an end face thereof facing toward the cavity Ca2, and a surface 14c of the sprue bushing 14. When the movable mold 21 is separated from the fixed mold 61 during molding operation, the gaps function as air-blowing passages for blowing air to release the molded substrate D4 from the fixed mold 61. The gaps communicate with piping, not shown, of a blower outside the mold assembly 51 via a gap between the surface 14c of the sprue bushing 14 and the fixed-side mirror 63, and a gap between the fixed-side mounting plate 12 and the fixed-side mirror 63. Further, as shown in FIG. 13, along the entire periphery of the stamper holder 65 toward the cavity Ca2, there is formed a ring-shaped holding piece 65a for holding the stamper 66 in a state pressed against the fixed-side mirror 63 (this construction is disclosed in Japanese Laid-Open Patent Publication (Kokai) No. 9-193206). In this case, as shown in FIG. 13, the holding piece 65a protrudes toward the cavity Ca2 when the stamper holder 65 is mounted.

Referring to FIG. 12, the stamper 66 is configured to have a disc-like shape, and an insertion hole 66h having a diameter slightly larger than an outer diameter of the stamper holder 65 is formed through a central portion of the stamper 66. Further, the stamper 66 has a groove-forming surface 66b (lower surface as viewed in FIG. 12) toward the cavity Ca2 configured such that micro asperities, such as grooves, can be formed in a surface of the substrate D4 during molding. The stamper 66 is positioned by the stamper holder 65 such that it is fixed to a predetermined location on the mirror surface 63b (surface toward the cavity Ca2) of the fixed-side mirror 63, and when air is sucked, the stamper 66 is attracted and fixed such that the inner peripheral portion and a mounting surface (upper surface as viewed in FIG. 11) thereof are brought into intimate contact with the fixed-side mirror 63. In mounting the stamper 66 on the fixed mold 61, the stamper holder 65 is inserted into the insertion hole 66h of the stamper 66, as shown in FIG. 12. In this case, since the insertion hole 66h is formed to have a diameter slightly larger than the outer diameter of the stamper holder 65, the stamper holder 65 is smoothly inserted into the insertion hole 66h. Then, while holding the stamper 66 using the holding piece 65a, the stamper holder 65 is fitted between the sprue bushing 14 and the fixed-side mirror 63. In this state, as shown in FIG. 13, since the holding piece 65a covers the gap between the inner peripheral surface of the stamper 66, defining the insertion hole 66h, and the outer peripheral surface of the stamper holder 65, burrs due to the gap are prevented from being formed on the substrate D4. By fixing the stamper 66 by the above method, it is possible to attach the stamper 66 to the fixed mold 61 without directly touching the groove-forming surface 66b thereof. This prevents the groove-forming surface 66b from being scratched or flawed.

The movable mold 21 is comprised of a movable-side mounting plate 22, a movable-side mirror 23, an outer peripheral ring 24, an ejector sleeve 25, a gate cutting sleeve 26, and an ejector pin 27. The movable-side mounting plate 22 is configured such that it can be mounted to a movable-side platen of the injection molding apparatus. The movable-side mirror 23 is formed to have a disc-like shape, and mounted to the movable-side mounting plate 22. The outer peripheral ring 24 is formed to have a hollow cylindrical shape and fitted on the outer periphery of the movable-side mirror 23. The ejector sleeve 25 is formed to have a hollow cylindrical shape and slidably mounted in holes formed through respective central portions of the movable-side mounting plate 22 and the movable-side mirror 23. The gate cutting sleeve 26 is formed to have a generally hollow cylindrical shape and slidably fitted in the sleeve 25. The ejector pin 27 is formed to have a columnar shape and slidably fitted in the gate cutting sleeve 26.

When the substrate D4 is molded using the mold assembly 51, first, the fixed mold 61 is mounted to the fixed-side platen of the injection molding apparatus, not shown, and the movable mold 21 is mounted to the movable-side platen of the injection molding apparatus. Then, driving means of the injection molding apparatus is operated to close the fixed mold 61 and the movable mold 21, as shown in FIG. 11. Then, a molten resin material is injected into the cavity Ca2 through the hole 14a of the sprue bushing 14. After the resin material in the cavity Ca2 is sufficiently cooled to be solidified, the driving means of the injection molding apparatus is operated to separate the movable mold 21 from the fixed mold 61. At this time, air is blown through the gap between the outer peripheral surface of the sprue bushing 14 and the inner peripheral surface of the stamper holder 65 to thereby release the substrate D4 from the fixed mold 61. Then, the ejector pin 27 and the ejector sleeve 25 are moved toward the fixed mold 61, causing the substrate D4 to be ejected. Thus, the substrate D4 is produced. In this case, as shown in FIG. 14, the substrate D4 has a central hole D4h formed through a central portion thereof. Further, a hollow cylindrical protruding portion D4r is formed around the central hole D4h on one surface (upper surface as viewed in FIG. 14) of the substrate D4. In a predetermined area on the one surface of the substrate D4, micro asperities, such as grooves, are formed by the stamper 66. Further, the substrate D4 has a annular groove D4d formed in a central portion of the one surface of the substrate D4, for which the holding piece 65a of the stamper holder 65 in contact with the resin is responsible.

Next, when the resin R is coated on the one surface (surface on which micro asperities, such as grooves, are formed) of the substrate D4 by the spin coating method to form a functional layer (protective layer, for example), the resin R is dropped from the nozzle N to a point in the vicinity of the outer peripheral surface of the hollow cylindrical protruding portion D4r, as shown in FIG. 14. Then, the substrate D4 is spinned, whereby the resin R is stretched (drawn) up to the periphery of the substrate D4. Subsequently, the coated resin is cured by a predetermined curing treatment. Thus, the functional layer is formed on the one surface of the substrate D4 without using the resin-coating assisting member.

However, after investigation of the above mold assembly 51, the present inventors have discovered the following points to be improved: In the mold assembly 51, since the holding piece 65a formed on the stamper holder 65 protrudes toward the cavity Ca2, the annular groove D4d is formed in the central portion of the one surface of the molded substrate D4. Therefore, when the resin R is coated on the one surface of the molded substrate D4 by the spin coating method, the annular groove D4d impedes the smooth drawing of the resin R, which can cause defects, such as uneven thickness of the resin R and formation of coating streaks. It is desirable to eliminate this inconvenience. To this end, there is contemplated a method that uses a stamper formed to have a reduced outer diameter so as to cause the annular groove to be formed at a location closer to the center of the substrate D4, to thereby prevent occurrence of uneven thickness of the resin R and formation of coating streaks. However, since there is a limit to reduction of the outer diameter of the stamper, it is difficult to completely prevent the occurrence of the above inconvenience by the above method. Further, to dispense with the holding piece 65a, a method is contemplated that causes the stamper 66 to be directly fitted in the sprue bushing without using the stamper holder, to thereby prevent the annular groove from being formed. In this method, however, to enhance operability in mounting the stamper, it is necessary to form the insertion hole 66h of the stamper 66 such that it has a diameter slightly larger than the outer diameter of the sprue bushing 14. If the insertion hole 66h is increased in diameter, since a gap is produced between the inner peripheral surface of the stamper, defining the insertion hole 66h, and the outer peripheral surface of the sprue bushing 14, and at the same time there is no holding piece 65a, burrs responsible for the gap are formed at the central portion of the substrate D4. Further, in this method, in mounting the stamper 66, it is necessary to directly touch the stamper 66, which can cause a scratch or a flaw to be formed on the groove-forming surface 66b of the stamper 66. This presents a hurdle in employing the method.

SUMMARY OF THE INVENTION

The present invention has been made in view of the above-described point to be improved, and it is a main object of the invention to provide a mold component and a mold assembly which make it possible to mold a substrate for an optical recording medium which enables a functional layer having a uniform thickness to be formed thereon without using a resin-coating assisting member.

In the mold component and the mold assembly according to the invention, the mold assembly includes a first mold and a second mold which are closed to thereby define a cavity therebetween for molding a substrate for an optical recording medium, and the mold component of the mold assembly is mounted to a mounting portion of the first mold of the mold assembly, and comprises a stamper having a molding surface for forming micro asperities in a surface of the substrate for the optical recording medium, and a stamper holder for holding the stamper thereon, the stamper holder being formed to have a generally hollow cylindrical shape such that the stamper holder can be mounted to the mounting portion of the first mold, wherein the stamper has an insertion hole formed through a central portion thereof, the insertion hole having a diameter which is larger than an outer diameter of a cavity-side end of the stamper holder when the stamper has a higher temperature than a normal temperature, and is reduced to be slightly smaller than the outer diameter when the stamper has the normal temperature, the stamper being held on the stamper holder, with the cavity-side end of the stamper holder being grasped by a rim of the insertion hole which is reduced in diameter at the normal temperature of the stamper, after having the cavity-side end of the stamper holder inserted therein at the higher temperature of the stamper.

According to the mold component and the mold assembly, through a central portion of the stamper, there is formed an insertion hole having a diameter which is larger than an outer diameter of a cavity-side end of the stamper holder, at a high temperature, and is reduced to be slightly smaller than the outer diameter at a normal temperature. The cavity-side end of the stamper holder inserted into the insertion hole of the stamper at the higher temperature is grasped by a rim of the insertion hole which is reduced in diameter at the normal temperature, to cause the stamper holder to hold the stamper thereon. As a result, a holding piece of the stamper holder for holding the stamper can be dispensed with, and hence it is possible to positively prevent a groove from being formed due to the projection of the holding piece in molding the substrate. Therefore, the resin can be dropped onto the central portion of the substrate, e.g. by forming the substrate such that it has a central hole having a small diameter. This makes it possible to form a functional layer having a uniform thickness on the substrate without using a resin-coating assisting member.

Preferably, the stamper holder is configured such that the outer diameter of the cavity-side end thereof is smaller than an outer diameter of an end of the stamper holder opposite to the cavity-side end. According to this configuration, when the stamper holder is inserted into the insertion hole of the stamper, a stepped portion is brought into abutment with the rim of the insertion hole, which makes it possible to insert the stamper holder into the insertion hole, while accurately positioning the stamper holder.

Preferably, the mold assembly further comprises a sprue bushing disposed in the first mold, and having the stamper holder mounted on an outer periphery thereof, and a cavity-side end face of the stamper holder is slightly protruded toward the cavity with respect to a cavity-side end face of the sprue bushing, while the molding surface of the stamper is slightly protruded toward the cavity with respect to the cavity-side end face of the stamper holder. According to this configuration, it is possible to prevent a gap from being formed between the stamper and the stamper holder, whereby burrs can be prevented from being formed during molding. Further, the substrate for an optical recording medium can be formed such that a surface of the substrate becomes slightly lower in level toward the radially outer side, which enables the resin to be drawn smoothly. Further, it is possible to prevent formation of an annular groove, thereby enabling the resin to be drawn more smoothly. This makes it possible to coat the resin having a substantially uniform thickness without unevenness.

It should be noted that the disclosure of the present specification relates to the subjects included in Japanese Patent Application No. 2002-278352 which was filed with Japanese Patent Office on Sep. 25, 2002, and all of the disclosures thereby are expressly incorporated herein by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Figure 1:
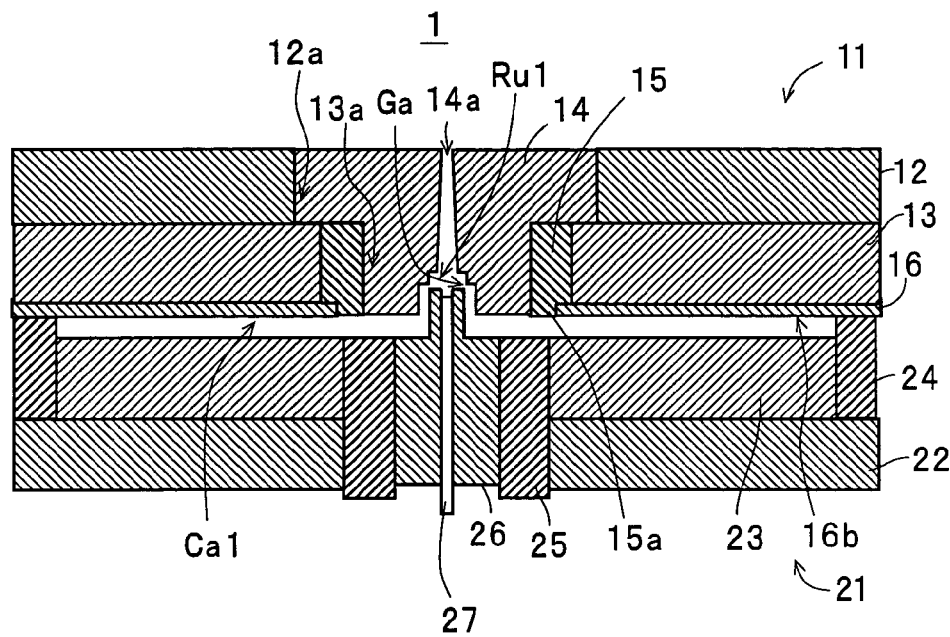
FIG. 1 is a cross-sectional view showing the construction of a mold assembly according to an embodiment of the present invention.

The invention will now be described in detail with reference to the drawings showing preferred embodiments thereof. It should be noted that the component parts and elements identical to those of the conventional mold assembly 51 are designated by identical reference numerals and detailed description thereof will be omitted.

First, the construction of a mold assembly 1 will be described with reference to drawings.

Figure 5:
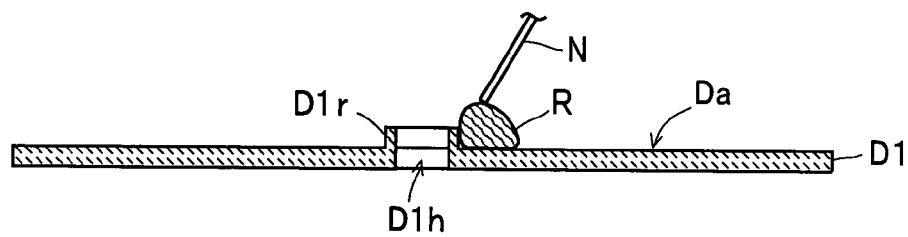
FIG. 5 is a cross-sectional view of a substrate molded by the mold assembly, with resin having been dropped thereon.

Referring first to FIG. 1, the mold assembly 1 is comprised of a fixed mold (first mold) 11, and a movable mold (second mold) 21 which can move to and away from the fixed mold 11. Further, the mold assembly 1 is configured such that a substrate D1 for an optical recording medium (hereinafter simply referred to as "the substrate D1") formed with a central hole D1$h$ and a hollow cylindrical protruding portion D1$r$, as shown in FIG. 5, can be molded by causing an injection molding apparatus, not shown, to inject a molten resin material into a cavity Ca1 formed by the molds 11, 12 in a closed state thereof.

Figure 4:
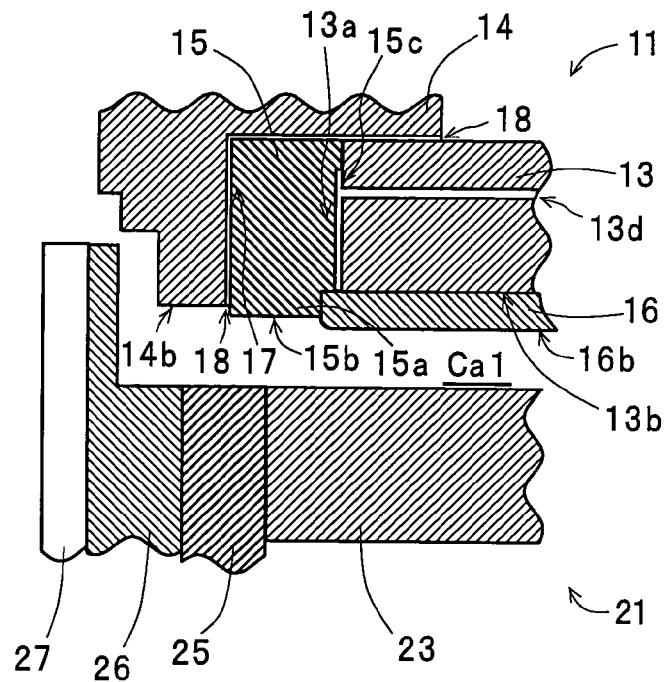
FIG. 4 is an enlarged cross-sectional view of essential elements of the stamper holder appearing in FIG. 1 and neighboring parts associated therewith.

As shown in FIG. 1, the fixed mold 11 is comprised of a fixed-side mounting plate 12, a fixed-side mirror 13, a sprue bushing 14, a stamper holder 15, and a stamper 16. The fixed-side mounting plate 12 is configured such that it can be mounted on a fixed-side platen of the injection molding apparatus, not shown, and has a hole 12a circular in cross section formed through a central portion thereof. The fixed-side mirror 13 is disc-shaped and mounted on the fixed-side mounting plate 12, with a hole 13a circular in cross section formed through a central portion thereof, such that it communicates with the hole 12a. Further, as shown in FIG. 4, the fixed-side mirror 13 is formed with holes 13d serving as air-sucking passages for sucking air to attract the stamper 16 to a mirror surface (surface of the mirror 13 toward the cavity Ca1) 13b. In this embodiment, each hole 13d has one end (on a right side as viewed in FIG. 4) communicating with piping, not shown, of a vacuum pump outside the mold assembly 1. The sprue bushing 14 is formed to have a hole 14a formed through a central portion thereof and fitted into the holes 12a, 13a.

Figure 2:
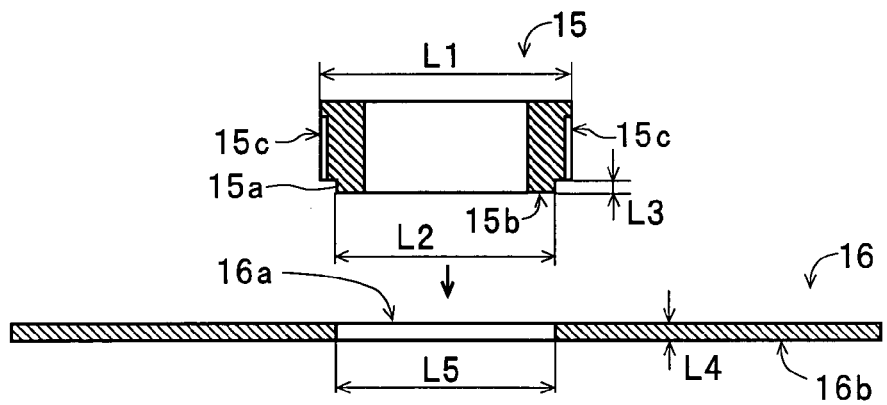
FIG. 2 is a cross-sectional view showing the constructions of a stamper holder and a stamper of the mold assembly.
Figure 3:
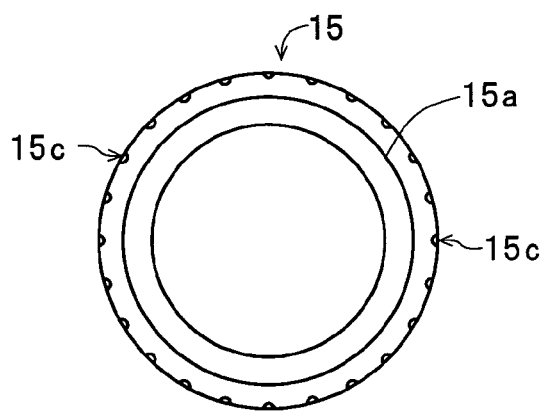
FIG. 3 is a bottom view of the stamper holder.

The stamper holder 15 constitutes the mold component according to the present invention together with the stamper 16, and is formed to have e.g. a hollow cylindrical shape, such that it can be removably mounted in a gap 17 (a mounting portion) between the outer peripheral surface of the sprue bushing 14 and the inner peripheral surface of the fixed-side mirror 13, which defines the hole 13a, as shown in FIG. 4. Further, as shown in FIGS. 2 and 3, the stamper holder 15 has an outer peripheral surface formed with a plurality of vertical grooves 15c, 15c, . . . In this embodiment, as shown in FIG. 4, the vertical grooves 15c and the inner peripheral surface of the fixed-side mirror 13 defining the hole 13a form air-sucking passages communicating with the holes 13d extending through the fixed-side mirror 13. Further, as shown in FIG. 2, the stamper holder 15 has a front end thereof toward the cavity Ca1 (downward as viewed in FIG. 2) which has a holding portion 15a integrally formed therewith in a protruding manner. The holding portion 15a has an outer diameter L2 which is smaller than an outer diameter L1 of a rear end of the stamper holder 15 opposite to the front end toward the cavity Ca1, and a height L3 (larger than 0 and equal to or smaller than 20 µm (e.g. 10 to 15 µm)) slightly smaller than a thickness L4 of the stamper 16. In this case, as shown in FIG. 4, the stamper holder 15 and the holding portion 15a has the height L3 adjusted such that when the stamper holder 15 is fitted in the gap 17, an cavity-side end face 15b of the holding portion 15a is slightly protruded into the cavity Ca1 with respect to a cavity-side end face 14b of the sprue bushing 14 (by a height larger than 0 and equal to or smaller than 20 µm (e.g. 10 to 15 µm)).

The stamper 16 is formed to have a generally disc-like shape, as shown in FIG. 2. Further, the stamper 16 has a groove-forming surface 16b facing toward the cavity Ca1. This surface 16b is formed with micro asperities such that micro asperities, such as grooves, can be formed in a surface of the substrate D1 when the substrate D1 is molded. Further, the stamper 16 has an insertion hole 16a formed through a central portion thereof. In this embodiment, the insertion hole 16a has a diameter L5 equal to or larger than the outer diameter L2 of the holding portion 15a when the stamper 16 has a high temperature (e.g. 100° C.) higher than normal temperature, whereas when the temperature of the stamper 16 is equal to the normal temperature, the diameter L5 of the insertion hole 16a is reduced to become slightly smaller than the outer diameter L2 of the holding portion 15a. Therefore, by heating the stamper to a high temperature and then having the holding portion 15a inserted into the insertion hole 16a by a shrinkage fitting method, the holding portion 15a is grasped by a rim of the insertion hole 16a reduced in diameter at the normal temperature, whereby the stamper 16 is held on the stamper holder 15. It has been empirically confirmed through experiments by the inventors that in this process of the stamper 16 being cooled to the normal temperature with the holding portion 15a fitted therein, to avoid deformation of the rim of the insertion hole 16a and its vicinity caused by shrinkage of the stamper 16, it is necessary to adjust the diameter L5 of the insertion hole 16a and the outer diameter L2 of the holding portion 15a such that the difference between the diameter L5 and the outer diameter L2 is, for example, equal to 10 µm or less at normal temperature. In the present embodiment, the diameter L5 and the outer diameter L2 are adjusted such that the difference therebetween at normal temperature becomes equal to approximately 5 µm, by way of example. It should be noted that throughout the specification, the term "normal temperature" is intended to mean a room temperature in a work place where the stamper holder 15 and the stamper 16 are mounted in the mold assembly 1, and a work place where the substrate D1 is molded. Further, since the stamper holder 15 is fitted in the gap 17 with the stamper 16 held thereon, the stamper 16 is mounted on the fixed mold 11 in an accurately positioned manner.

On the other hand, as shown in FIG. 1, the movable mold 21 is comprised of a movable-side mounting plate 22, a movable-side mirror 23, an outer peripheral ring 24, an ejector sleeve 25, a gate cutting sleeve 26, and an ejector pin 27.

Next, a mounting procedure for mounting the stamper 16 and the stamper holder 15 in the fixed mold 11 will be described with reference to drawings.

First, the holding portion 15a of the stamper holder 15 is fitted in the insertion hole 16a of the stamper 16 by the shrinkage fitting method. More specifically, the stamper 16 is heated to a predetermined temperature (high temperature in the present invention: 100° C., for example). At this time, the diameter L5 of the insertion hole 16a is expanded to a size slightly larger than the outer diameter L2 of the holding portion 15a of the stamper holder 15 by thermal expansion of the stamper 16. Then, the holding portion 15a is inserted into the insertion hole 16a thus expanded. At this time, since a stepped portion of the stamper holder 15 made by the holding portion 15a (surface of the stamper holder 15 toward the cavity Ca1, which is not formed with the holding portion 15a) is brought into abutment with the rim of the insertion hole 16a, the holding portion 15a is inserted into the insertion hole 16a in an accurately positioned manner. Further, the holding portion 15a is configured such that the height L3 thereof is slightly smaller than the thickness L4 of the stamper 16, so that as shown in FIG. 4, the groove-forming surface 16b of the stamper 16 is slightly protruded into the cavity Ca1 with respect to the end face 15b of the holding portion 15a. Now, the insertion hole 16a of the stamper 16 is made e.g. by press working, and hence as shown in FIG. 4, the corner of the rim thereof is rounded. In this case, assuming that the holding portion 15a is formed such that the groove-forming surface 16b and the end face 15b become flush with each other, a gap is formed by the rounded corner of the stamper 16 and the outer peripheral surface of the holding portion 15a, which can lead to formation of burrs at a central portion of the substrate D1 when the substrate D1 is molded. In the mold assembly 1, however, the holding portion 15a is formed such that the groove-forming surface 16b is protruded with respect to the end face 15*b*, which prevents the above gap from being formed, thereby making it possible to prevent burrs from being formed.

Then, the stamper 16 is subjected to natural cooling until the temperature thereof is lowered to the normal temperature (room temperature in the work place). At this time, since the stamper 16 is shrunk as a whole by being cooled, the rim of the insertion hole 16*a* is also uniformly shrunk toward the center of the insertion hole 16*a*. Therefore, the outer peripheral surface of the holding portion 15*a* is constricted by a shrinkage force of the rim of the insertion hole 16*a*, whereby the stamper 16 is held on the holding portion 15*a* (i.e. the stamper holder 15) with a proper holding force such that it does not come off. Then, the stamper holder 15 with the stamper 16 held thereon is fitted into the gap 17 in the fixed mold 11. At this time, as shown in FIG. 4, air is sucked through the air-sucking passages formed by the vertical grooves 15*c* and the inner peripheral surface of the fixed-side mirror 13 defining the hole 13*a*, the holes 13*d* in the fixed-side mirror 13, and air-sucking holes, not shown, opening in the outer periphery of the fixed-side mirror 13, and the sucking force brings the reverse surface of the stamper 16 (opposite surface to the groove-forming surface 16*b*) into intimate contact with the mirror surface 13*b* (surface toward the cavity Ca1) of the fixed-side mirror 13, whereby the stamper 16 is secured to the fixed mold 11.

Next, a method of molding the substrate D1 using the above mold assembly 1, and a method of forming a functional layer (protective layer or the like) on the molded substrate D1 will be described with reference to drawings. It should be noted that description redundant with respect to the description of the molding method using the conventional mold assembly 51 will be omitted.

First, the fixed-side mounting plate 12 is secured to the fixed-side platen of the injection molding apparatus, not shown, whereby the fixed mold 11 is mounted on the injection molding apparatus. Next, the movable-side mounting plate 22 is attached to a movable-side platen of the injection molding apparatus, whereby the movable mold 21 is mounted on the injection molding apparatus. Then, the driving means of the injection molding apparatus is operated to close the fixed mold 11 and the movable mold 21. At this time, as shown in FIG. 1, a disc-shaped cavity Ca1 capable of molding the substrate D1 is formed by the molds 11 and 21. Further, a runner Ru1 is formed between the upper surface of the gate cutting sleeve 26 and one end face of the ejector pin 27, and an inner peripheral surface of the sprue bushing 14, which defines the hole 14*a*. Then, a molten resin material is injected from a nozzle of the injection molding apparatus. The molten resin material injected is filled in the cavity Ca1 through the runner Ru1 and a gate Ga. Then, the gate cutting sleeve 26 and the ejector pin 27 are forwardly (upwardly) moved toward the sprue bushing 14 in a state of the resin material in the cavity Ca1 being soft, whereby the resin material in the runner Ru1 and the resin material in the cavity Ca1 are separated at a location of the gate Ga.

Figure 6:
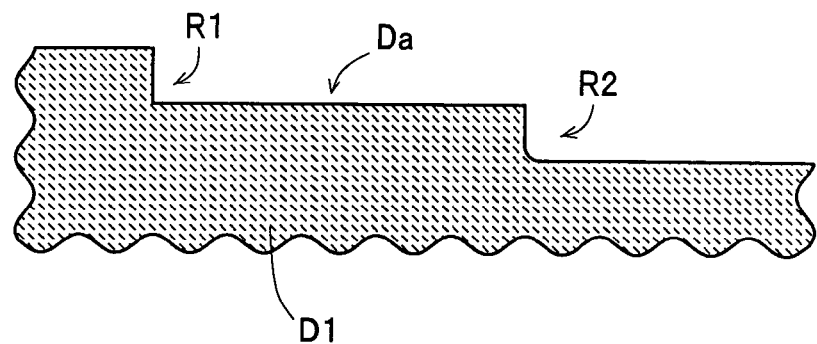
FIG. 6 is an enlarged cross-sectional view of a portion of the substrate close to a central hole.

Next, after the resin material in the cavity Ca1 is sufficiently cooled to be solidified, the driving means of the injection molding apparatus is operated to move the movable mold 21 away from the fixed mold 11 to open the mold assembly 1. At this time, air is blown through a gap 18 (see FIG. 4) formed between the sprue bushing 14, and the end face of the fixed-side mirror 13 opposite to the mirror surface 13*b*, the end face of the stamper holder 15 remote from the cavity Ca1, and an inner peripheral surface of the stamper holder 15 to thereby release the substrate D1 from the fixed mold 11. Then, the ejector pin 27 and the ejector sleeve 25 are moved toward the fixed mold 11, whereby the resin material remaining in the runner Ru1 and the substrate D1 are ejected. Thus, the substrate D1 is produced. At this time, as shown in FIG. 5, the substrate D1 has a central hole D1*h* formed through a central portion thereof. Further, the substrate D1 has grooves, not shown, formed by the stamper 16 in a predetermine area on one surface (hereinafter referred to as the "surface Da") thereof. Further, as shown in FIG. 4, the end face 15*b* of the holding portion 15*a* integrally formed with the stamper holder 15 is slightly protruded into the cavity Ca1 with respect to the end face 14*b* of the sprue bushing 14, and the groove-forming surface 16*b* of the stamper 16 is slightly protruded into the cavity Ca1 with respect to the end face 15*b* of the holding portion 15*a*. As a result, as shown in FIG. 6, on the central portion of the surface Da of the substrate D1, there are formed steps R1, R2 such that an outer portion becomes lower in level (by a height larger than 0 and equal to or smaller than 20 µm (e.g. 10 to 15 µm)).

Next, in forming the functional layer (e.g. the protective layer) by coating the resin R on the surface Da of the substrate D1 by the spin coating method, as shown in FIG. 5, the resin R is dropped from the nozzle N to a location in the vicinity of the outer periphery of the hollow cylindrical protruding portion D1*r*. Then, by spinning the substrate D1, the resin R is stretched (drawn) up to the periphery of the substrate D1. In this case, differently from the substrate D4 molded using the conventional mold assembly 51, the above-mentioned annular groove is not formed, so that impediments to drawing of the resin R are eliminated. Further, at the steps R1, R2, the surface Da of the substrate D1 becomes slightly lower in level toward the outer peripheral side, which enables the resin R to be drawn smoothly. Accordingly, it is possible to coat the surface Da with the resin R having a substantially uniform thickness without unevenness, and prevent occurrence of defects, such as formation of coating streaks. Then, the resin R coated on the surface Da is cured by carrying out the predetermined curing treatment, whereby the functional layer having the substantially uniform thickness is formed. In this case, the inventors have confirmed through experiments that as the steps R1, R2 are formed at respective closer locations to the inner periphery of the substrate D1, the resin R is coated to a more uniform thickness without unevenness. Therefore, it is preferable that the outer diameter of the sprue bushing 14 of the mold assembly 1 toward the cavity and the outer diameter L2 of the holding portion 15*a* are made as small as possible.

As described hereinabove, the mold assembly 1 is configured such that the holding portion 15*a* of the stamper holder 15 is inserted into the insertion hole 16*a* when the stamper 16 has been heated to a high temperature, and grasped by the rim of the insertion hole 16 which is reduced in diameter at normal temperature, whereby the stamper 16 is held on the stamper holder 15. This makes it possible for the stamper holder 15 to dispense with a holding piece for holding the stamper 16, thereby making it possible to positively prevent a groove from being formed due to the projection of the holding piece when the substrate D1 is molded. Therefore, by forming a protruding end of the gate cutting sleeve 26 such that it has a small diameter, that is, by forming the central hole D1*h* of the substrate D1 such that it has a small diameter, the resin R can be dropped onto the central portion of the substrate D1. This makes it possible to form a functional layer to a uniform thickness without using the resin-coating assisting member, such as the disc-shaped member 72. Further, the end face 15*b* of the holding portion 15*a* is slightly protruded into the cavity Ca1 with respect to the end face 14*b* of the sprue bushing 14, and the groove-forming surface 16*b* of the stamper 16 is slightly protruded into the cavity Ca1 with respect to the end face 15*b* of the holding portion 15*a*. This makes it possible to form the surface Da of the substrate D1 such that it is slightly lowered in level at the steps R1, R2 toward the outer periphery of the substrate D1, which enables the resin R to be drawn smoothly. Further, it is possible to prevent the surface Da from being formed with the annular groove, so that the resin R can be drawn more smoothly. This makes it possible to coat the surface Da with the resin R to a substantially uniform thickness without unevenness.

Figure 7:
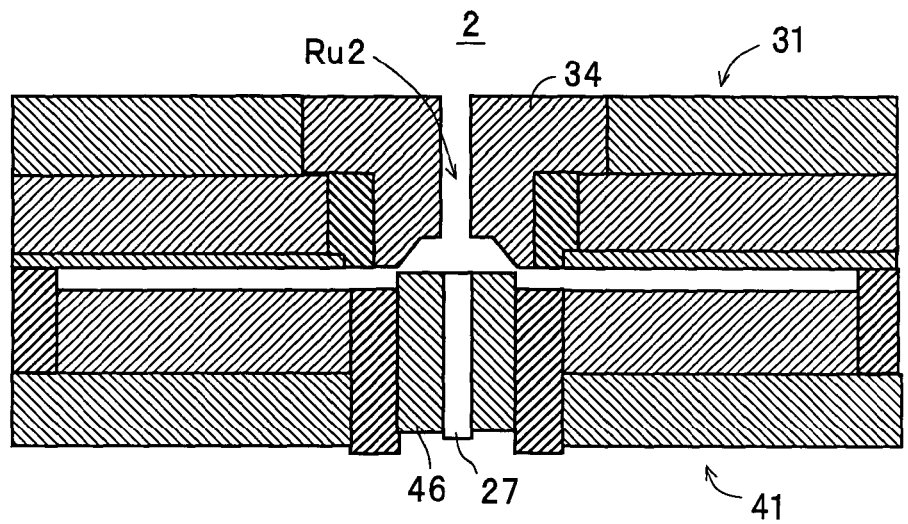
FIG. 7 is a cross-sectional view showing the construction of a mold assembly according to another embodiment of the present invention.
Figure 8:
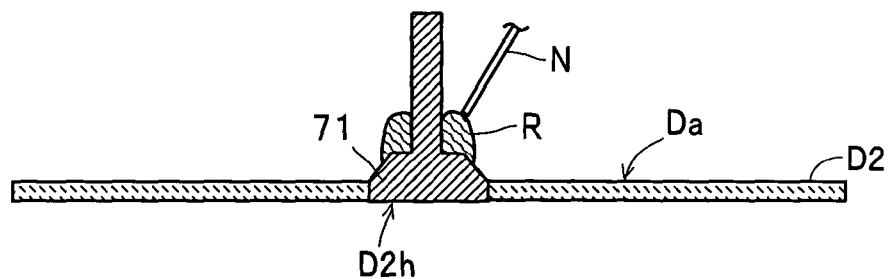
FIG. 8 is a cross-sectional view of a substrate molded by the mold assembly shown in FIG. 7, with resin having been dropped thereon.

It should be noted that the present invention is not limited to the above embodiment, but it can be applied to a mold assembly 2 constructed as shown in FIG. 7. As shown in this figure, the mold assembly 2 has a sprue bushing 34 disposed therein, in place of the sprue bushing 14 of the fixed mold 11 used in the mold assembly 1. Further, it has a gate cutting sleeve 46 disposed therein, in place of the gate cutting sleeve 26 of the movable mold 21 used in the mold assembly 1. In this mold assembly 2, when a fixed mold 31 and a movable mold 41 are closed, a disc-shaped runner Ru2 is defined between the upper surface of the gate cutting sleeve 46 and the end face of the ejector pin 27, and an inner peripheral surface of the sprue bushing 34. Therefore, when a substrate D2 shown in FIG. 8 is molded by using the mold assembly 2, a disc-shaped member 71, which is a separate member from the substrate D2, is molded by the runner Ru2, together with the substrate D2, as shown in FIG. 8. Further, as shown in this figure, the substrate D2 has a central hole D2h formed in a central portion thereof. In this case, the central hole D2h may have a large-sized diameter as large as the central hole D3h of the substrate D3 described above, or alternatively it may have a small-sized diameter similar in size to that of the central hole D1h of the substrate D1.

In coating a resin R on a surface Da of the substrate D2 by the spin coating method, the disc-shaped member 71 is fitted in the central hole D2h of the substrate D2, as shown in FIG. 8, and then the resin R is dropped onto the disc-shaped member 71 from a nozzle N. After that, the substrate D2 is spinned for coating the resin R. In this case, the resin R can be dropped onto a portion close to the center of the substrate D2, without forming any groove in the surface Da of the substrate D2, which enables the resin R to be uniformly coated. According to the mold assembly 2, it is possible to use the runner (the disc-shaped member 71) which is normally recycled or disposed of without being made use of, as the resin-coating assisting member for coating the resin R. This makes it possible to effectively utilize resources and reduce manufacturing costs of the mold assembly without carrying out troublesome maintenance operations, such as cleaning.

Figure 9:
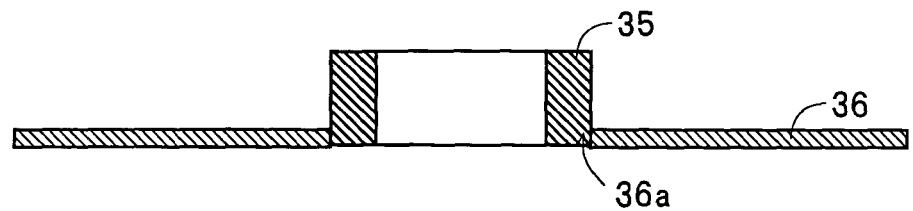
FIG. 9 is a cross-sectional view showing the constructions of a stamper holder and a stamper according to another embodiment of the present invention.
Figure 10:
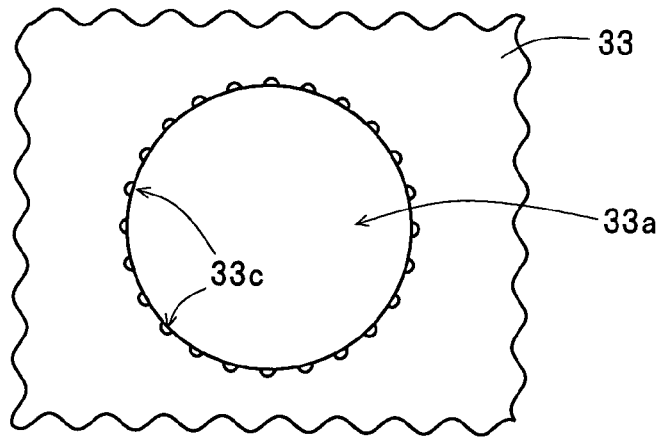
FIG. 10 is a bottom view of a fixed-side mirror according to another embodiment of the present invention.
Figure 11:
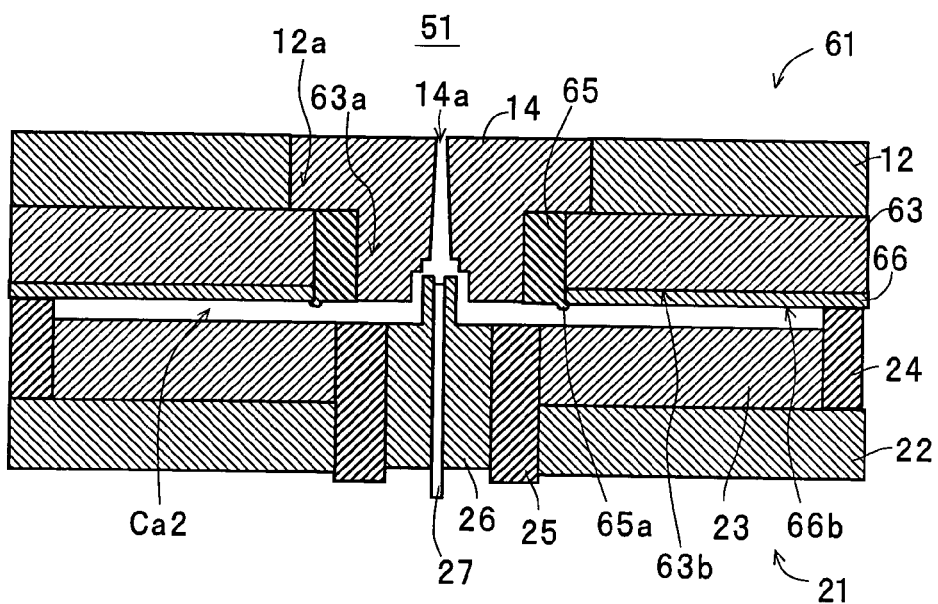
FIG. 11 is a cross-sectional view showing the construction of a mold assembly that the inventors have already developed.
Figure 12:
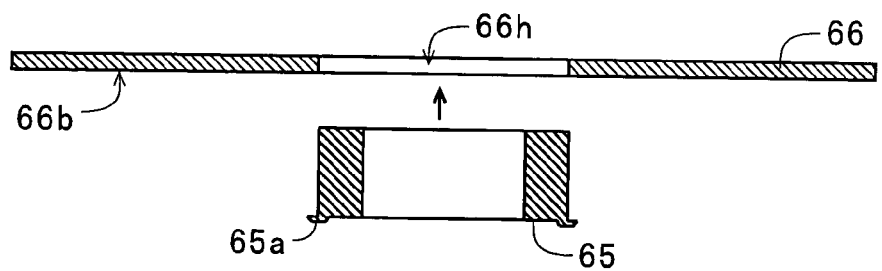
FIG. 12 is a cross-sectional view showing the constructions of a stamper holder and a stamper shown in FIG. 11.
Figure 13:
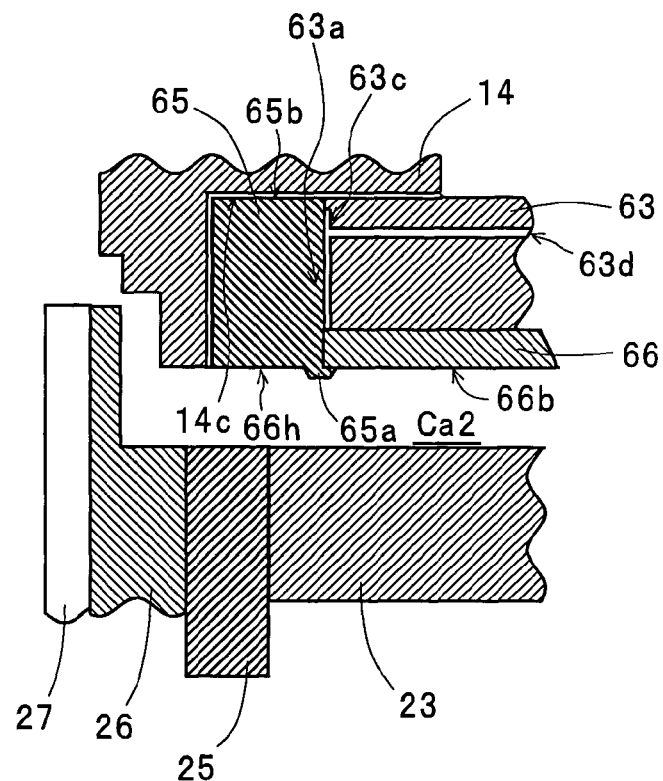
FIG. 13 is an enlarged cross-sectional view of essential elements of the stamper holder appearing in FIG. 11 and neighboring parts associated therewith.
Figure 14:
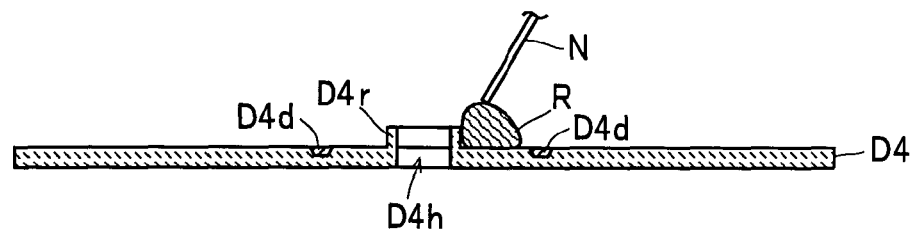
FIG. 14 is a cross-sectional view of a substrate molded by the mold assembly shown in FIG. 11, with resin having been dropped thereon.
Figure 15:
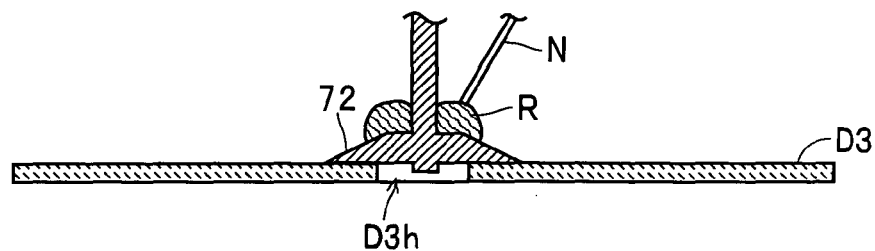
FIG. 15 is a cross-sectional view of a conventional substrate, with resin having been dropped thereon.

Further, it is possible to employ a stamper holder 35 and a stamper 36, shown in FIG. 9, in place of the stamper holder 15 and stamper 16 of the fixed mold 11. In this case, the stamper holder 35 is not formed with the holding portion 15a, and is configured such that it becomes higher by the height L3 of the holding portion 15a. Further, the stamper holder 35 has an outer peripheral surface which is not formed with grooves corresponding to the vertical grooves 15c of the stamper holder 15. Furthermore, an insertion hole 36a of the stamper 36 is formed to a size allowing the same to be fitted on an end of the stamper holder 35 by the shrinkage fitting method described hereinbefore. Further, the mold assembly incorporating the stamper holder 35 and the stamper 36 includes a fixed-side mirror 33 shown in FIG. 10, in place of the fixed-side mirror 13 of the fixed mold 11. In this embodiment, as shown in FIG. 10, the fixed-side mirror 33 has vertical grooves 33c formed in an inner peripheral surface defining a hole 33a, for forming air-sucking passages. The mold assembly constructed as above is also capable of molding the substrate D1, similarly to the mold assembly 1.

What is claimed is:

1. A mold component of a mold assembly that includes a first mold and a second mold which close to thereby define a cavity therebetween for molding a substrate for an optical recording medium, the mold component being mounted to a mounting portion of the first mold of the mold assembly, and comprising:
    a stamper having a molding surface configured to form micro asperities in a surface of the substrate for the optical recording medium; and
    a stamper holder configured to hold said stamper thereon, said stamper holder having a generally hollow cylindrical shape such that said stamper holder can be mounted to the mounting portion of the first mold,
    wherein said stamper has an insertion hole extending through a central portion thereof, the insertion hole having a diameter which is larger than an outer diameter of a cavity-side end of said stamper holder when said stamper is at a higher temperature than a normal temperature, and, the insertion hole diameter being smaller than the outer diameter of the cavity-side end of said stamper holder when said stamper is at a normal temperature and is not held on the stamper holder, said stamper being held on said stamper holder, with the cavity-side end of said stamper holder being grasped by a rim of the insertion hole which has the smaller diameter when the stamper is at the normal temperature, after having the cavity-side end of said stamper holder inserted therein when the stamper is at the higher temperature.

2. A mold component as claimed in claim 1, wherein said stamper holder is configured such that the outer diameter of the cavity-side end thereof is smaller than an outer diameter of an end of said stamper holder opposite to the cavity-side end.

3. A mold assembly for defining a cavity for molding a substrate for an optical recording medium, comprising:
    a first mold having a mounting portion;
    a second mold which closes together with said first mold to thereby define a cavity between said first mold and said second mold;
    a stamper having a molding surface configured to form micro asperities in a surface of the substrate for the optical recording medium; and
    a stamper holder configured to hold said stamper thereon, said stamper holder having a generally hollow cylindrical shape such that said stamper holder can be mounted to said mounting portion of said first mold,
    wherein said stamper has an insertion hole extending through a central portion thereof, the insertion hole having a diameter which is larger than an outer diameter of a cavity-side end of said stamper holder when said stamper is at a higher temperature than a normal temperature, and the insertion hole diameter being smaller than the outer diameter of the cavity-side end of said stamper holder when said stamper is at a normal temperature and is not held on the stamper holder, said stamper being held on said stamper holder, with the cavity-side end of said stamper holder being grasped by a rim of the insertion hole which has the smaller diameter when the stamper is at the normal temperature, after having the cavity-side end of said stamper holder inserted therein when the stamper is at the higher temperature.

4. A mold assembly as claimed in claim 3, wherein said stamper holder is configured such that the outer diameter of the cavity-side end thereof is smaller than an outer diameter of an end of said stamper holder opposite to the cavity-side end.

5. A mold assembly as claimed in claim 3, further comprising a sprue bushing disposed in said first mold, said stamper holder being mounted on an outer periphery thereof,
    wherein a cavity-side end face of said stamper holder is slightly protruded toward the cavity with respect to a cavity-side end face of said sprue bushing, and wherein the molding surface of said stamper is slightly protruded toward the cavity with respect to the cavity-side end face of said stamper holder.

6. A mold assembly as claimed in claim 4, further comprising a sprue bushing disposed in said first mold, said stamper holder being mounted on an outer periphery thereof,
    wherein a cavity-side end face of said stamper holder is slightly protruded toward the cavity with respect to a cavity-side end face of said sprue bushing, and wherein the molding surface of said stamper is slightly protruded toward the cavity with respect to the cavity-side end face of said stamper holder.

7. A mold assembly, comprising:
a stamper configured to mold a surface of a substrate for an optical recording medium, said stamper having an insertion hole; and
a stamper holder, said stamper holder including a holding portion inserted within the insertion hole, wherein said stamper is secured to the holding portion of said stamper holder by heat shrinkage,
wherein a height of the holding portion is less than a height of the stamper.

* * * * *